(12) United States Patent
Chang

(10) Patent No.: US 7,980,058 B2
(45) Date of Patent: Jul. 19, 2011

(54) AIR COMPRESSION TYPE ENGINE FOR AVIATION

(76) Inventor: Stanley Chang, GuangDong Province (CN)

( * ) Notice: Subject to any disclaimer, the term of this patent is extended or adjusted under 35 U.S.C. 154(b) by 942 days.

(21) Appl. No.: 11/659,888

(22) PCT Filed: Apr. 19, 2006

(86) PCT No.: PCT/CN2006/000730
§ 371 (c)(1),
(2), (4) Date: Sep. 26, 2007

(87) PCT Pub. No.: WO2006/116907
PCT Pub. Date: Nov. 9, 2006

(65) Prior Publication Data
US 2008/0127629 A1    Jun. 5, 2008

(30) Foreign Application Priority Data

Apr. 30, 2005  (CN) .......................... 2005 1 0034447

(51) Int. Cl.
*F02K 1/00* (2006.01)
(52) U.S. Cl. ........................................... 60/229; 60/228
(58) Field of Classification Search .................... 60/228, 60/229, 230; 239/265.25, 265.27
See application file for complete search history.

(56) References Cited

U.S. PATENT DOCUMENTS

| | | | |
|---|---|---|---|
| 736,715 A * | 8/1903 | Gervais ............................ 60/805 |
| 3,130,543 A * | 4/1964 | Oldfield et al. .................. 60/229 |
| 3,271,948 A | 9/1966 | Fuller |
| 3,318,095 A * | 5/1967 | Snell ............................ 60/226.1 |
| 3,380,661 A | 4/1968 | Markowski et al. |
| 4,222,234 A | 9/1980 | Adamson |
| 5,720,453 A * | 2/1998 | Platt ................................ 60/230 |
| 5,960,625 A * | 10/1999 | Zdvorak, Sr. ................. 60/39.34 |
| 6,102,329 A * | 8/2000 | Guinan et al. .................. 60/229 |
| 6,105,364 A * | 8/2000 | Zdybel ............................ 60/228 |

(Continued)

FOREIGN PATENT DOCUMENTS

EP        1 050 678        8/2000

(Continued)

OTHER PUBLICATIONS

Office Action in corresponding JP Application 2008-508053, mailed May 17, 2011.

*Primary Examiner* — Ted Kim
(74) *Attorney, Agent, or Firm* — Beyer Law Group LLP

(57) ABSTRACT

The present invention relates to an air compression type engine for aviation. The conventional aircraft engine is complicated in structure, consumes expensive aero fuel, and produces extremely loud noise during operation. Therefore, the present invention employs a turbo-charged air compressor to generate high temperature and high pressure gas in the pressure chamber, and uses the reaction thrust force generated by ejecting the compressed air through the nozzle to make the aircraft vertically take off/land, suspend in the air and fly forwardly. Benefited from the simple structure, the manufacture cost of the aircraft engine can be dramatically decreased. Vertically raising and landing the aircraft can be achieved by changing the ejection directed of the compressed air in the pressure chamber. The commonly used gasoline or diesel, which is cost saving and capable of combusting with a high combustion value, can be used instead of the expensive aviation kerosene. Further, the generated noise is quite small. By means of above arrangement, it is possible to manufacture a jet type manned craft like a car, which can be operated by common people to vertically take off/land and shuttle conveniently in the downtown area through simple operation procedure.

5 Claims, 5 Drawing Sheets

U.S. PATENT DOCUMENTS 6,918,244 B2 * 7/2005 Dickau .................. 60/229

FOREIGN PATENT DOCUMENTS

| GB | 593403 | 10/1947 |
| --- | --- | --- |
| JP | 40-4527 | 2/1970 |
| JP | 10-18860 | 1/1998 |
| JP | 2000-503363 | 3/2000 |
| JP | 2000-356167 | 12/2000 |
| JP | 2001-317378 | 11/2001 |
| WO | WO 97/26454 | 7/1997 |

* cited by examiner

AIR COMPRESSION TYPE ENGINE FOR AVIATION

FIELD OF INVENTION

The present invention relates to a jet-type turbine engine, and particularly to an air compression type engine for aviation.

BACKGROUND OF INVENTION

Nowadays, a known jet-type aviation engine is configured to draw the air by intake compressor, warm the intake air by the heat generated through burning the aviation kerosene within the combustion chamber, eject rapidly the intake air backward after expanded due to the warming, and then utilize the reaction force thus achieving the forward flight of an aircraft. In such engine, there exist several disadvantages listed as below:

(1). The configuration of the engine is very complicated, and the manufacture cost of the engine is unbearably high. Unlike an internal combustion engine used in a common vehicle, the structure of which is very simple and manufacture cost of which is low, the jet-type aviation engine usually costs up to millions of dollars, which negatively limits the manufacture and application of the aircraft.

(2). To rapidly eject backwardly the intake air immediately after being warmed in the combustion chamber, it is required that the fuel must be burned rapidly so as to have a good efficiency. Consequently, instead of the commonly used gasoline or diesel which is cost saving and capable of combustion with a high combustion value, only the expensive aviation kerosene with a low combustion value can be employed.

(3). Rapidly ejecting backwardly the intake air immediately after being warmed in the combustion chamber would result in that the ejected air-flow with high power is unstable and hard to be controlled in terms of its ejection direction, which renders the technique of vertically ascending/descending the aircraft by changing the ejection direction of the air-flow too complicated. Even the aforementioned problem may be solved by extensive manpower and material resources, it is still hard to operate the aircraft, deteriorating its applicability and acceptability. One obvious example is the costly vertically ascending/descending fighter plane "HARRIER" from GB. Although engineers of GB have solved the difficult problem of vertically ascending/descending the aircraft by changing the direction of the air-flow with huge cost, and the eligible pilot, among the best of the best, is strictly selected and trained for operating the "HARRIER", a crash rate of the "HARRIER" is still significantly higher than the other types of fighter planes, most of the lost of "HARRIER" are accidentally crashed due to the complicated operation procedure of the "HARRIER".

(4). In the conventional jet-type aviation engine, because the combustion chamber fails to be isolated, the loud noise caused by deflagrating the fuel within the combustion chamber would be directly transmitted to the outside together with the ejected air-flow, causing the airport must be built in the places miles away from the downtown. Even the aviation engine of mini size, for instance the small type aviation engine employed by the U.S. TOMAHAWK Cruise Missile, would still cause large noise during its operation, getting on people's nerves.

CONTENTS OF THE INVENTION

The present invention is directed to solve aforementioned problems of the conventional jet-type aviation engine, and provide a novel aviation engine of air compression type.

To solve above problems, an air compression type engine for aviation according to the present invention comprises an air intake port, a turbo-charged air compressor, a combustion chamber, and a rear nozzle, characterized in that: a pressure chamber is arranged between the rear nozzle for providing thrust force for forward flying and the combustion chamber; the turbo-charged air compressor includes an intake compressor, a large supercharging compressor module, and a small supercharging compressor which are coupled to a front transmission shaft, and further includes a front driving turbine and a rear driving turbine which are coupled to a rear transmission shaft; a speed changed gear box is arranged between the front transmission shaft and the rear transmission shaft, the combustion chamber is arranged behind the speed change gear box, and a fuel nozzle member is arranged at the front end of the combustion chamber; after being pressurized by the intake compressor and the large supercharging compressor module for few levels, a large portion of the air enters into a main intake passage, while a small portion of the air enters into a sub-intake passage after being further pressurized by the small supercharging compressor; the air entering the sub-intake passage is mixed with fuel sprayed by the fuel nozzle at the front part of the combustion chamber for effecting explosive combustion, the air entering the main intake passage is mixed with the gas still in explosive combustion at the rear part of the combustion chamber, and plenty of oxygen carried by the air facilitates the combustion of the remained unburnt fuel; the high temperature and high pressure gas generated by the explosive combustion is ejected through an exhausting port of an ejection fence to drive the front driving turbine to rotate, then passes through an intake port of a cover of the rear driving turbine to drive the rear driving turbine to rotate, and finally enters the pressure chamber, a large torque generated by rotation of the front driving turbine and the rear driving turbine exerts to the speed changed gear box via the rear transmission shaft, increasing a rotation speed of the front transmission shaft, and thereby making the intake compressor, the large supercharging compressor module, and the small supercharging compressor coupled to the front transmission shaft rotate in a high speed, brings in more air and generates large pressure to force the intake air passing through the main intake passage and the sub-intake passage and entering the combustion chamber; the high temperature and the high pressure gas entering the pressure chamber can be ejected through the rear nozzle member to push the aircraft flying forwardly.

By means of above arrangement, the present invention employs a turbo-charged air compressor to generate high temperature and high pressure gas in the pressure chamber, and uses the reaction thrust force generated by ejecting the compressed air through the nozzle to make the aircraft vertically take off/land, suspend in the air and fly forwardly. Benefited from the simple structure, the manufacture cost of the aircraft engine can be dramatically decreased. Vertically raising and landing the aircraft can be achieved by changing the ejection direction and flow rate of the compressed air in the pressure chamber. The commonly used gasoline or diesel which is cost saving and capable of combusting with a high combustion value can be used instead of using the expensive aviation kerosene. Further, the generated noise is quite small. By means of above arrangement, it is possible to manufacture a jet type mini manned craft like a car, which can be operated by common people to vertically take off/land and shuttle conveniently in the downtown area through simple operation procedure.

The ejection fence, more preferably, is arranged on the bottom of the combustion chamber, the exhausting port of the ejection fence is at an angle of 60 degrees with respect to the plane of the ejection fence, the total area of the exhausting port of the ejection fence is ⅓ of the area of the ejection fence, thereby causing the high temperature and high pressure air-flow generated in the combustion chamber can be ejected at a certain angle and exerted on the front driving turbine with a larger pressure more effectively to generate larger thrust; a heat insulation cover for resisting high temperature is arranged on the rear transmission shaft for preventing the rear transmission shaft from being burnt directly by the flame, and thus prolonging the operating life of the rear transmission shaft; a rear driving turbine cover is arranged on the rear driving turbine, on which are opened with six intake ports of the rear driving turbine, the total area of the six intake ports is equal to that of the exhausting ports on the ejection fence, the air-flow ejected through the intake ports of the rear driving turbine further drives the rear driving turbine to rotate at an optimal angle, and enters the pressure chamber via the exhausting ports of the rear driving turbine; by means of this arrangement, the temperature and the pressure in the combustion chamber can be increased greatly, and the high temperature and high pressure air-flow generated by explosive combustion of the fuel can exert on the front driving turbine and the rear driving turbine most effectively at an optimal angle, thereby the turbo-charged air compressor can create the higher pressure in the pressure chamber.

More preferably, the main support frame of the aircraft is made hollow and is formed as a part of the engine pressure chamber, and is divided into two parts, which are a left hollow main support frame and a right hollow main support frame. In this way, the internal space of the aircraft can be used effectively, and the internal volume occupied by the engine can be decreased. The pressure chamber communicates with the left hollow main support frame, the right hollow main support frame is connected to the lower nozzle module and the left hollow main support frame via the switch member, the end, of the right hollow main support frame is provided with rear nozzle member; the switch member can control the high pressure air-flow in the pressure chamber to pass through the left hollow main support frame to the right hollow main support frame, and finally eject from the rear nozzle for pushing the aircraft to fly forwardly; or alternatively the high pressure air-flow in the pressure chamber may pass through the left hollow main support frame to the lower nozzle module, and finally eject from the lower nozzle group. The face of the lower nozzle module which is provided with the lower nozzle group can be swung forward, backward, leftward and rightward enable the lower nozzle group to eject the air-flow in all directions, thereby driving the aircraft to take off/land, decelerate, suspend or move slowly forward, backward, leftward and rightward.

Several small nozzles (generally sixteen nozzles arranged in four lines, which may be changed according to the practical requirements) consisting of a lower nozzle group are provided in an air ejection face of the lower ejection member for enlarging the air ejection area of the air-flow ejected underneath the aircraft. This arrangement may greatly decrease the force impinged on the ground by the air-flow ejected underneath the aircraft, and further dramatically increase the supporting area of the aircraft for rising up, therefore the aircraft can be operated relatively easier and more stable during process of taking off/landing.

The lower nozzle members providing thrust force to make the aircraft rise/lower, decelerate, suspend in the air, and slightly move forward, backward, leftward and rightward together with the rear nozzle member functioning to provide thrust force for forward movement of the aircraft may also be designed alternatively in the following way according to practical requirements:

More preferably, a front right nozzle member, a front left nozzle member, a rear right nozzle member, and a rear left nozzle member are provided on the pressure chamber, each of these nozzle members is provided with a controller and an air-flow switching valve, the controller is used for regulating the nozzle member to rotate forwardly, downwardly, and backwardly for 180 degrees. The rear nozzle member can push the aircraft flying forwardly, while the reaction force generated by the other four nozzle members can drive the aircraft to decelerate, suspend or take off/land vertically. By such arrangement, when it is applied to the aircraft, the aforementioned four lower nozzles would eject air-flow downwardly to vertically take off, eject air-flow backwardly to increase the thrust, and eject air-flow forwardly to decelerate the aircraft. (When the aircraft is about to take off, the four lower nozzle members are opened and adjusted to orientations vertically facing downward. The engine then starts thereafter, and the air-flow rate of pertaining nozzles is regulated according to the state of the aircraft to make the aircraft take off stably. When the aircraft raises above the ground for five meters or even higher, ejection directions of the four lower nozzle members are turned backwardly, generating upward and forward resultant forces and making the aircraft fly upwardly and forwardly at a certain angle. When the aircraft raises to a desired altitude, the ejection directions of the four lower nozzle members are turned backwardly to 180 degrees. The rear nozzle member is gradually opened while the four lower nozzle members are gradually closed to make the aircraft fly horizontally. As soon as the four lower nozzle members are completely closed, the rear nozzle is fully opened, and then the pilot may operate the aircraft in a way as that for operating a common jet type plane. When the aircraft is about to land, the ejection directions of the four lower nozzle members are turned forwardly. The rear nozzle member is gradually closed while the four lower nozzle members are gradually opened, making the aircraft decelerates gradually. As soon as the four lower nozzle members are fully opened, the rear nozzle is completely closed. When the aircraft has been decelerated to a certain speed, the ejection directions of the four lower nozzle members can be turned backward gradually, thus generating a resultant thrust force upward and backward, and causing the aircraft decelerate gradually and descend gradually; and then the ejection directions of the four lower nozzle members can be turned downward and their ejection rate can be making the aircraft vertically land slowly.) This improves the flexibility and mobility of the aircraft.

More preferably, the air-flow switching valve is consisted of a shutter valve and a regulation valve, characterized in that:

1. the valve spool of the shutter valve is a wedge-shaped member, which is capable of eliminating the problem that the intake port of the high pressure air may be tightly closed due to the difference in the rate of thermal contract/expansion between the valve spool and the passage wall; because the valve spool blocks in front of the intake port of the high pressure air, and the area of the spool is ⅓ times larger than that of the intake port of the high pressure air, the pressure of the high pressure air in the pressure chamber does not exert directly on the valve spool of the regulation valve, thereby preventing any accident from happening due to auto ejection of the high pressure air, which may be caused by the damage of the thread of the regulation valve resulting from the fact that the valve spool stays always in the high pressure state;

2. the valve spool of the regulation valve is a truncated cone-shaped member, which is fixed to a middle section of the valve shaft of the regulation valve, the valve body of the regulation valve is provided with corresponding sealing surface, front and rear sections of the valve shaft of the regulation valve engage with the thread of the valve body of the regulation valve, the valve shaft of the regulation valve is provided with sealing thread. When the nozzles are to be opened, initially the driving motor coupled to the shutter valve gets started to rise the shaft of the shutter valve, bring the shutter valve move upwardly, and eventually open up the intake port for the high pressure air. At that moment, the driving motor coupled to the valve shaft of the regulation valve starts to adjust the valve shaft of the regulation valve to move backwardly. This makes the intake port for high pressure air and the nozzles get opened, and then the high pressure air within the pressure chamber can be ejected from the nozzles. Because the valve spool of the regulation valve is a trunctated cone-shaped member, the backward movement length of the valve spool can determine the flow rate of the high pressure air ejected from the high pressure chamber, thereby controlling the thrust force generated from the nozzles.

When the nozzles are about to close, initially the driving motor coupled to the valve shaft of the regulation valve starts to drive the valve shaft moving forwardly, thus closing the intake port for the high pressure air and the nozzles, and preventing the high pressure air within the pressure chamber from being ejected through the nozzles. The valve spool of the regulation valve is the truncated cone-shaped member provided at a front end thereof with a cylinder member with sealing thread, which is fixed to the valve shaft of the regulation valve and can be screwed together with the thread of the passage, consequently the valve spool of the regulation valve is able to surely close up the intake port for the high pressure air; and 3. Both the nut of the valve shaft of the shutter valve and the valve shaft of the regulation valve are driven by the driving motor for controlling and regulating the ejecting air-flow.

By using aforementioned technical solution, the present invention possess the following advantages:

(1). The structure of the turbo-charged air compressor of the present invention is fairly simple, which is consisted of the intake compressor, the large supercharging compressor module, the small supercharging compressor, the front driving turbine, the rear driving turbine, the speed changed gear box, the fuel ejection member, the wall of the combustion chamber, the air ejection fence, and the cover of the rear driving turbine. Therefore the manufacture cost of the air compression type engine for aviation is low, which is as simple and cheap as a common internal combustion engine for a heavy-duty truck, helping the popularity of the aircraft.

(2). The high pressure air-flow generated by the turbo-charged air compressor of the present invention is not ejected to the outside immediately, which is ejected into the pressure chamber of the aircraft instead, generating high temperature and high pressure gas within the pressure chamber. The air-flow thus could stay in a high temperature, high pressure, and oxygen sufficient environment for a relatively longer time period. Thus the fuel can combust to the largest extent and release the maximum energy, dramatically increasing the efficiency of the fuel. In this way, the pollution to the environment by the exhaust gas generated by the fuel can be decreased, and it is possible to use the commonly used gasoline or diesel which is high in combustion value but low in price. In this way, the aircraft may carry less common gasoline or diesel to generate substantially the same level of energy as generated by combustion of much more aviation kerosene. This improves the loading efficiency of the aircraft, and decreases dramatically the cost for operational maintenance.

(3). The high pressure air-flow generated by the turbo-charged compressor of the present invention is not ejected to the outside immediately, which is ejected into the pressure chamber of the aircraft instead, generating high temperature and high pressure gas within the pressure chamber. Thus the pressure chamber can be used as a buffer for the ejection air-flow, improving stability of the flow rate of the ejected air-flow, and facilitating operation of the aircraft. The ejection direction and the flow rate of the compression air can be controlled conveniently in a low cost, as the commonly used air compressor and air actuated apparatus in the industry. This renders convenience of operation of the aircraft, making it possible to manufacture a jet type aircraft like a car, which can be operated by common people to vertically take off/land in a convenient way.

(4). Because the pressure chamber is behind the combustion chamber, the noise produced by explosive combustion of the fuel in the combustion chamber can be isolated and absorbed by the high pressure gas in the pressure chamber and the dense high pressure air-flow passing through the main intake passage without being spread to the outside. During operation of the air compression type engine for aviation, relatively feeble noise (as quiet as operating of a vehicle) would be generated due to the air intake by the intake compressor and air-flow ejection by the nozzle member, making it possible to manufacture a jet type manned craft like a car, which can shuttle in the downtown area.

INDUSTRY APPLICABILITY

Compared with the conventional technique, the aviation engine of air compression type of the present invention possesses prominent substantive features and represents notable progress. The substantial distinguishing features compared with the conventional jet aviation engine lay in that: the flow rate of the air-flow ejected by the conventional jet aviation engine is very large while the pressure of the air-flow is not high enough, the aviation engine of air compression type of the present invention is capable of ejecting air-flow with an average flow rate but a very high pressure. The conventional jet aviation engine could operate merely in the low altitude where the density of the air is relatively high. When the aircraft flies to the high altitude (20 thousands meters, for example) where the density of the air is relatively low, because the conventional jet aviation engine needs to take in large amount of air-flow to generate effective thrust, the operation efficiency would be dramatically decreased and even ends up to no thrust. The aviation engine of air compression type, however, needs to take in not so much air to generate effective thrust, thus it can be operated in the high altitude (40 thousands meters, for example) where the air concentration is low, and even operatable adjacent to the edge of the aerosphere. The advantageous technical effect is obvious.

In the case that such aircraft (so called "aero travel vehicle") is successfully produced, the jet aircraft we saw in the film "STAR WAR" (which is able to vertically take off/land and shuttle in the downtown area) would become reality. The layout of the city and the style of the architecture would change accordingly. Like in the condition that the carriage is substituted by the vehicle in those years, the whole society of people would be changed significantly.

The present invention can also be applied to the new type of space shuttle, making the new type of space shuttle, which is equipped with the aviation engine of air compression type and the self-employed rocket and bears a manufacture cost as low as that for a common jet civil aircraft (compared to the cost for a conventional space shuttle and a carrier rocket with large thrust), available for taking off/landing via a common airport, taking in air, burning common gasoline, flying to the edge of the aerosphere, and then starting the self employed rocket to get into the outer space. When it is about to return back from the outer space, the self employed rocket would be started initially to decelerate, and the aviation engine of air compression type would be restarted and the nozzle would be regulated to move forwardly when it reaches the edge of the aerosphere. The aviation engine of air compression type takes in the air and combusts common gasoline to generate large thrust force to overcome the attraction of the gravitation, decelerates the speed of the space shuttle, operates the space shuttle like the common civil aircraft to fly in the aerosphere with a relatively low speed (subsonic speed) for a long distance, and lands in the common civil airport.

Since the rocket employed by the new type of the space shuttle merely operates in a short time period when the shuttle is accelerating to get out of the aerosphere and decelerating to return back to the aerosphere, the new type of the space shuttle may bring small amount of rocket fuel and oxidant for flying, thus improve the loading capacity of the space shuttle. Because the new type of the space shuttle decelerated by the aviation engine of air compression type when entering the aerosphere would not generate high temperature up to several thousand degrees on its surface, which would be created otherwise in the condition of the conventional space capsule when moving in the aerosphere with a high speed, the massiness heat insulation cover equipped on the conventional space capsule and shuttle is thus not required. This further increases the effective loading capacity while reducing the manufacture cost of the new type of the space shuttle.

Since the new type of space shuttle is operable like the common civil aircraft to fly in the aerosphere with a relatively low speed (subsonic speed) for a long distance by taking in air and burning common gasoline, the new type of space shuttle can land in the common civil airport like the common civil aircraft in 24 hours and in all weather, thereby greatly decreasing the cost for space flight.

When the new type of space shuttle equipped with the aviation engine of air compression type (which is low in cost and high in loading capacity) is successfully produced, exploitation of the outer space would enter a new stage, during which we may go out to and come back from the outer space inexpensively and conveniently, like taking the civil aircraft now.

PREFERRED EMBODIMENTS OF THE INVENTION

Figure 1:
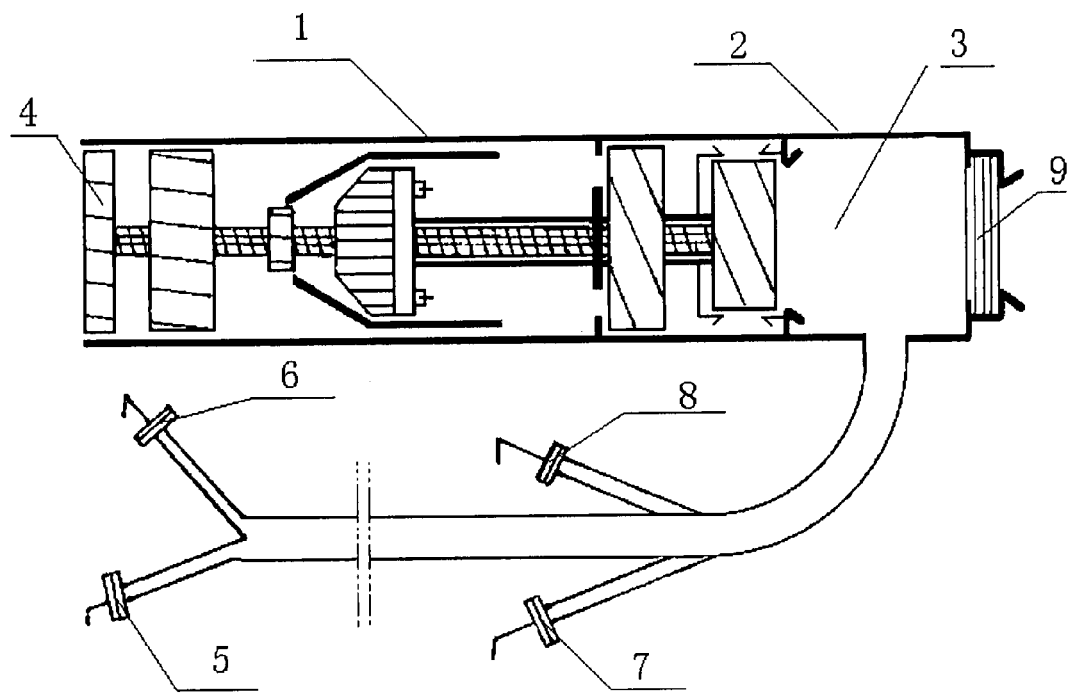
FIG. 1 is an illustration showing a configuration of an air compression type engine for aviation.

The present invention will be discussed according to the preferred embodiment in connection with the appended drawings.

In the detailed description, each component will be represented by one reference numeral respectively, wherein: 1 refers to a turbo-charged air compressor; 2 refers to a housing of titanium alloy; 3 refers to a pressure chamber; 4 refers to an air intake port; 5 refers to a front right nozzle member; 6 refers to a front left nozzle member; 7 refers to a rear right nozzle member; 8 refers to a rear left nozzle member; 9 refers to a rear nozzle member; 10 refers to an intake compressor; 11 refers to a large supercharging compressor module; 12 refers to a small supercharging compressor; 13 refers to a speed changed gear box; 14 refers to an air-flow switching valve member; 15 refers to a fuel nozzle; 16 refers to a rear transmission shaft; 17 refers to a heat insulation cover for resisting high temperature; 18 refers to an air ejection fence; 19 refers to an exhaust port of the air ejection fence; 20 refers to a combustion chamber; 21 refers to a wall of the combustion chamber; 22 refers to a main intake passage with a width of 1 cm; 23 refers to a sub-intake passage with a width of 0.2 cm; 24 refers to a spool of a shutter valve; 25 refers to a front driving turbine, 26 refers to a rear driving turbine; 27 refers to a cover of the rear driving turbine; 28 refers to an intake port of the cover of the rear driving turbine; 29 refers to an exhaust port of the rear driving turbine; 30 refers to a spool of a regulation valve; 31 refers to a shaft of the regulation valve; 32 refers to a body of the regulation valve; 33 refers to a nut of the shaft of the shutter valve; 34 refers to a driving motor; 35 refers to a front transmission axle; 36 refers to a right hollow main bracket; 37 refers to an air-flow switching member; 38 refers to an intake passage of a lower nozzle member; 39 refers to an intake passage of a rear nozzle; 40 refers to the lower nozzle member; 41 refers to a small nozzle of the lower nozzle member; and 42 refers to a left hollow main bracket.

Figure 2:
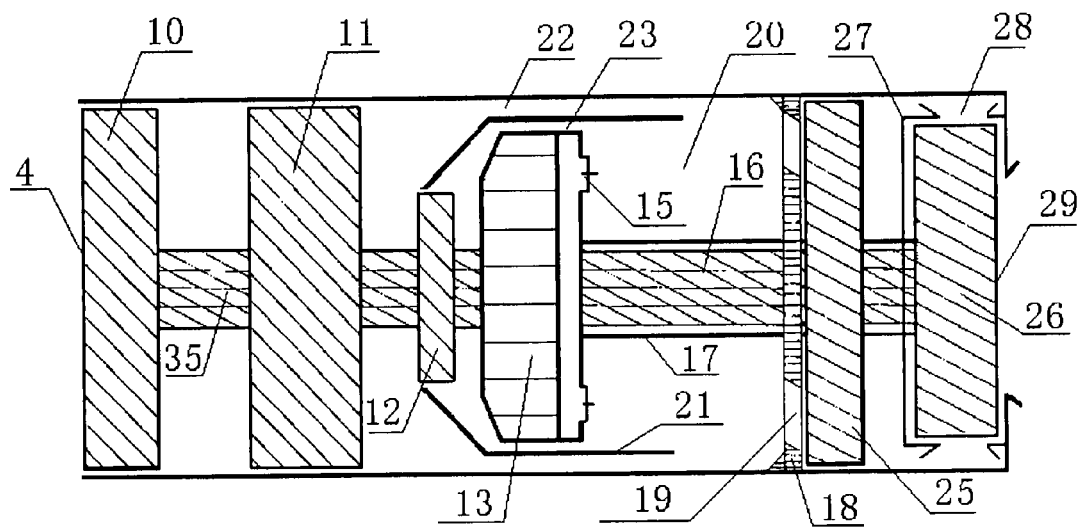
FIG. 2 is an illustration showing a configuration of turbo-charged air compressor.
Figure 3:
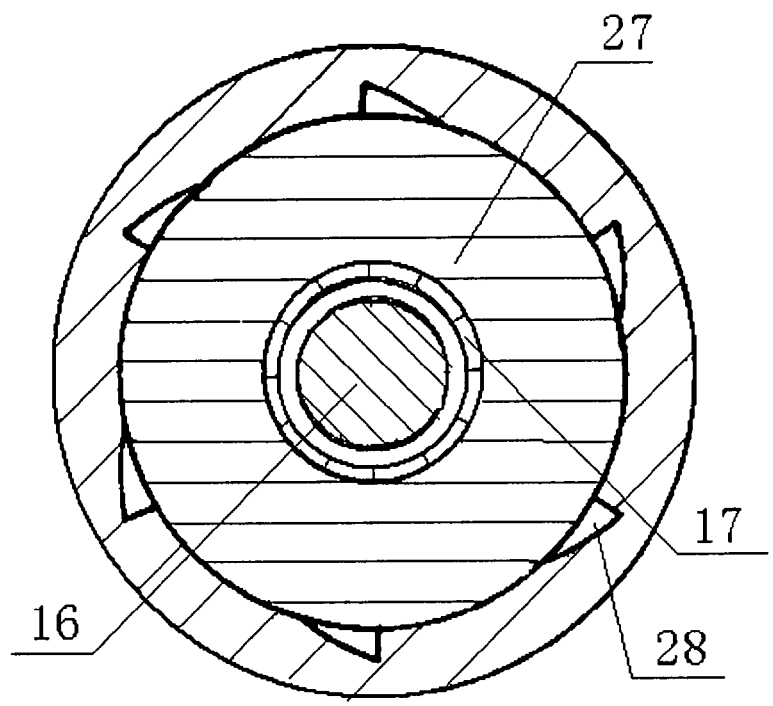
FIG. 3 is an illustration showing a sectional view of a cover of the rear driving turbine.
Figure 4:
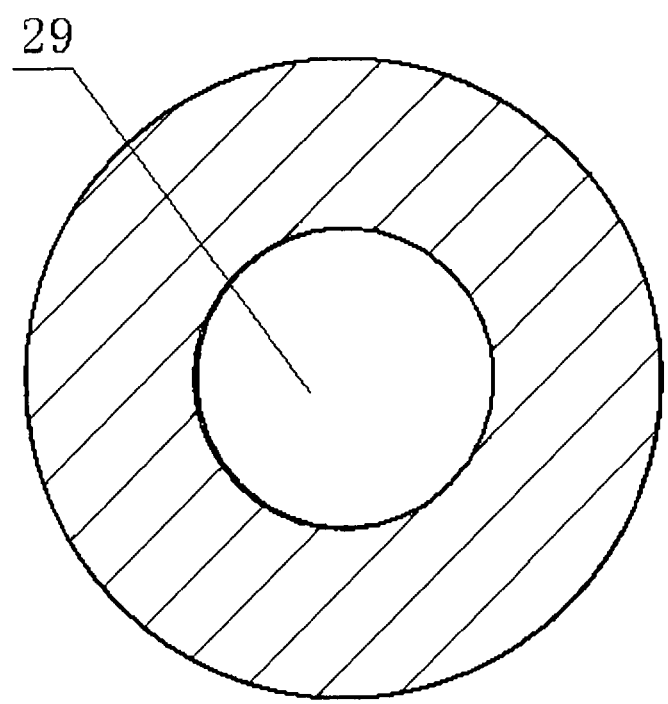
FIG. 4 is an illustration showing a sectional view of the bottom of the pressure chamber.

As shown in FIGS. 1 and 2, the intake compressor 10 takes in the external air through the air intake port 4. The intake air is pressurized by the large supercharging compressor module 11 to be high pressure air-flow, and the large portion of which enters the combustion chamber 20 through the main intake passage 22 with the width of 1 cm, while a small portion of which is additionally pressurized by the small supercharging compressor 12 to be air-flow with higher pressure, which enters the combustion chamber 20 through the sub-intake passage 23 with the width of 0.2 cm only, and is further mixed with the spray of fuel ejected by the fuel nozzle 15 for explosive combustion. The combustion gas is further mixed with the extensive air coming from the main intake passage, and burns with the oxygen in the air, resulting in the air temperature within the combustion chamber being increased greatly and thus causing high pressure. Because the total area of all the exhaust ports 19 of the ejection fence 18 is much larger than the total area of the main intake passage and the sub-intake passage, and the length of the main intake passage and the sub-intake passage is much larger than the thickness of the ejection fence 18, the high pressure air within the combustion chamber is rapidly ejected in a certain angle through the exhaust port 19 of the ejection fence, driving the front driving turbine 25 to rotate in a high speed and thus driving the transmission shaft 16 to rotate. The exhaust port 19 of the ejection fence 18 is oriented at a 60 degree direction with respect to a plane in which the ejection fence 18 is located in order to make the ejected air-flow exert on the front driving turbine 25 more effectively. In FIG. 3, the cover 27 of the rear driving turbine is provided on the rear driving turbine 26, in which cover there are opened with six intake ports 28 of the cover of the rear driving turbine. The total area of the six intake ports is equal to the total area of the exhaust ports of the ejection fence. The air-flow ejected from the intake ports 28 of the cover of the rear driving turbine further drives the rear driving turbine 26 at the most effective angle to rotate the turbine 26 in a high speed, and enters the pressure chamber 3 through the exhaust ports 29 of the turbine 26. Additionally, the turbine 26 exerts force on the rear transmission shaft 16 and brings the rear transmission shaft 16 to rotate in cooperation with the front driving turbine 25. Such arrangement results in the temperature and the pressure within the combustion chamber 20 rising significantly, and makes the high speed air-flow generated by explosive combustion of the fuel exert on the front driving turbine 25 and the rear driving turbine 26 in the greatest extent, resulting that the compression air with permissible largest pressure is capable of being generated within the pressure chamber 3 by the turbo-charged air compressor.

In FIG. 2, by means of shifting provided by the speed changed gear box 13, the rear transmission shaft 16 makes the front transmission shaft 35 rotate in a speed three times faster than that of the rear transmission shaft 16, and drives the intake compressor 10, the large supercharging compressor module 11 and the small supercharging compressor 12 to rotate in a speed three times faster than that of the front driving turbine 25 and the rear driving turbine 26. Thereby creating an air-flow which enters the combustion chamber 20 with a pressure high enough.

Figure 5:
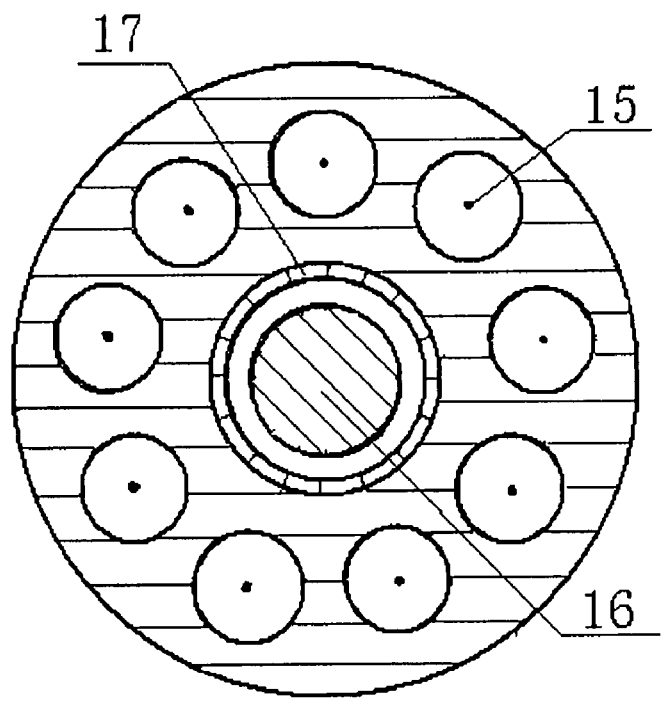
FIG. 5 is an illustration showing a sectional view of the bottom of the combustion chamber.
Figure 6:
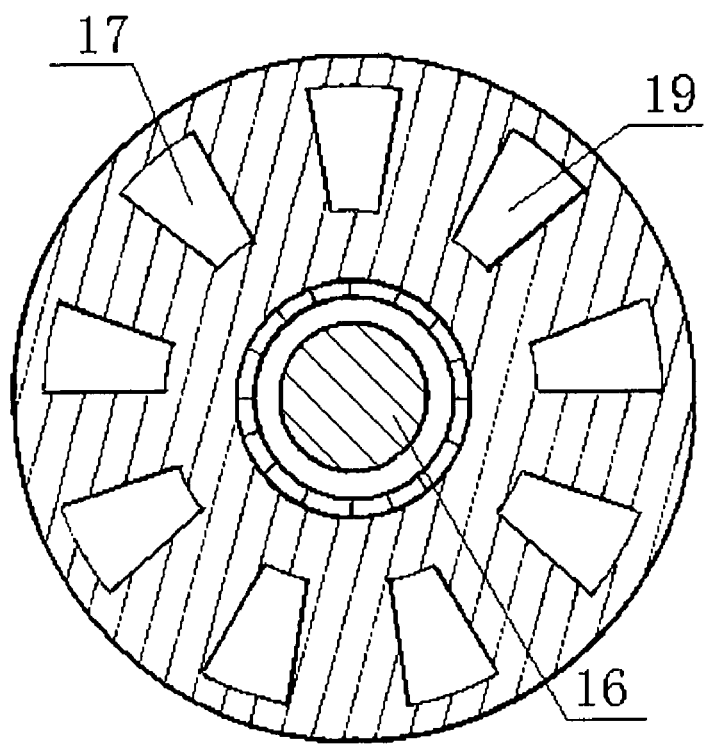
FIG. 6 is an illustration showing a sectional view of the air ejection fence.

In FIG. 5, the fuel ejection member in the combustion chamber 20 is consisted of nine fuel nozzles 15 divided into three groups, wherein each group includes three fuel nozzles 15 spaced apart equally. Three groups of the fuel nozzles 15 are similar to three gear positions of a vehicle, wherein by changing the operation status of different groups of fuel nozzles 15 and by controlling the amount of fuel ejected by each ejection nozzle 15, the operator may control the thrust force and speed of the aircraft. For instance, in the case that the largest thrust force is required when the aircraft ascends vertically, the three groups of nine fuel nozzles 15 can be controlled to eject fuel simultaneously and each fuel nozzle 15 ejects the largest amount of fuel so as to provide the largest thrust. When the aircraft flies horizontally, merely one group of three fuel nozzles 15 is required to operate to eject fuel, while the other two groups of six fuel nozzles 15 can be closed to save the fuel. The amount of fuel ejected by the three operation fuel nozzles can be changed to vary the flying speed of the aircraft.

The high pressure air-flow passing through the main intake passage 22 forms a dense air barrier, which isolates and absorbs the loud noise generated by the fuel in the combustion chamber 20 during its explosive combustion. The high pressure gas in the pressure chamber 3 further isolates and absorbs the loud noise generated by the fuel in the combustion chamber to during its explosive combustion. This helps to prevent the loud noise generated by the fuel in the combustion chamber 20 during its explosive combustion from transferring to the outside, thus minimizing the noise during the operation of the engine.

The high pressure air-flow passing through the main intake passage 22 takes away the heat of the wall of the combustion chamber, making the energy generated by the explosive combustion of the fuel is used effectively. The high pressure air-flow passing through the main intake passage 22 is mixed with the gas after explosive combustion. The large amount of oxygen contained in the air-flow facilitates further combustion of the unburnt fuel. Because the oxygen is sufficient, and the air-flow stays in the high temperature and high pressure environment in the combustion chamber 20 and the pressure chamber 30 for a relatively long period, the fuel can be burnt completely, generating its energy to the largest extent. The heat generated further increases the temperature and the pressure of the high pressure gas in the pressure chamber 3. This is of benefit to optimizing the combustion of the fuel, and further makes it possible to use the fuel difficult in combustion, high in combustion value but low in price (for example, commonly used gasoline or diesel) instead of the expensive aviation kerosene with a low combustion value. In this way, the aircraft may carry much less amount of common gasoline or diesel to generate substantially the same level of energy as generated by combustion of much more aviation kerosene. This improves the loading efficiency of the aircraft, and decreases dramatically the exhaust released during operation of the engine, benefiting protection of the environment.

Figure 8:
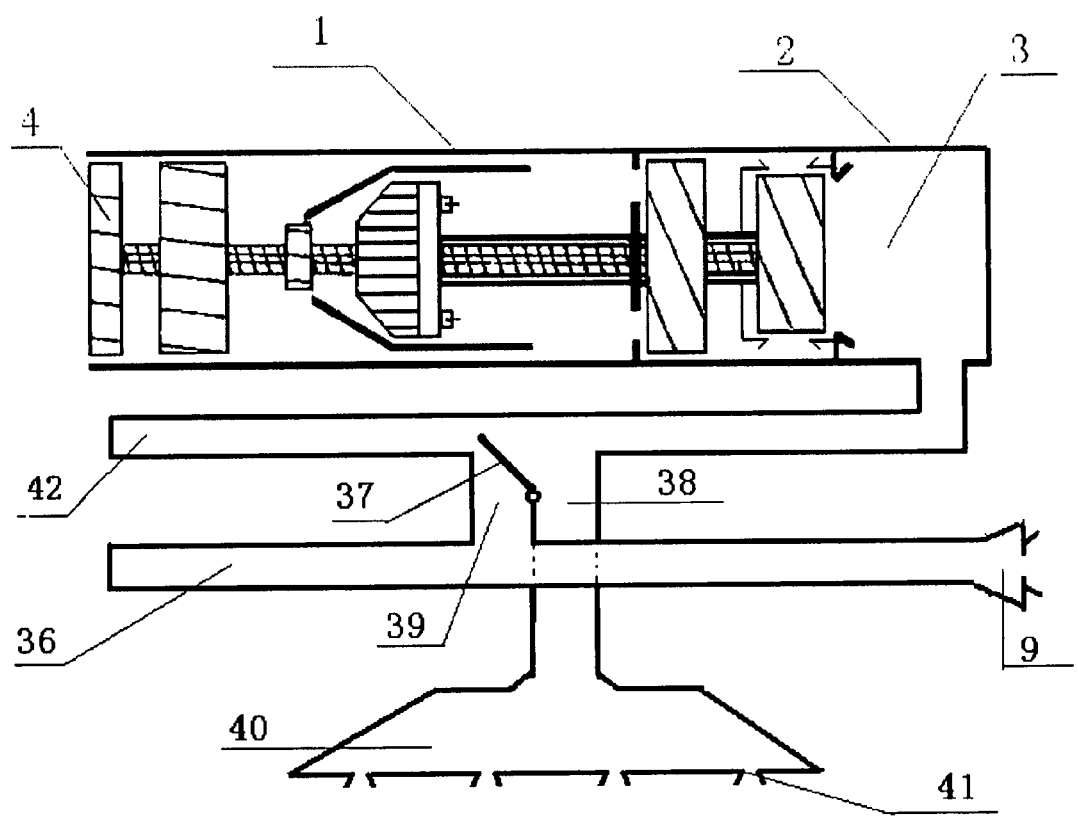
FIG. 8 is an illustration showing another configuration of an air compression type engine for aviation.

Because the total area of the nozzles is much smaller than that of the exhaust ports 29 of the rear driving turbine 26, the air-flow ejected from the exhaust ports 29 forms the high pressure gas in the pressure chamber 3, and is ejected from the openings of the nozzle members at an extremely high speed, thus generating thrust force with a magnitude ranging from 50 thousand newtons to 60 thousand newtons. This enables the small type of aircraft which is directed for carrying people and weights from 4 tons to 5 tons to vertically take off or land, and fly forwardly. The shape of the pressure chamber 3 can be modified according to the shapes of the bottom and the tail of the aircraft. Because the wall of the pressure chamber is made of titanium which is in possession of 2 cm thickness and characterized of light weight and high rigidity, the pressure chamber 3 can be formed into the bottom or the tail of the aircraft, or the main support frame of the aircraft can be formed into a hollow structure to be used as a part of the pressure chamber of the engine (as shown in FIG. 8), thereby saving the manufacture material and the weight of the aircraft. In case that the aircraft crashed accidentally, the strong pressure chamber 3 could also serve well for protection.

As shown in FIG. 1, the air compression type engine for aviation is provided with four nozzle members (5, 6, 7, and 8) and one rear nozzle member 9, wherein four of them (5, 6, 7, and 8) located below the aircraft serve for the raising/lowering of the aircraft, one of them 9 located at the back of the aircraft serves for providing thrust force for the aircraft. Opening and closing of the nozzle members and the air-flow passing therethrough are regulated by an air-flow switching valve. Four nozzle members (5, 6, 7, and 8) are connected with the pressure chamber 3 via titanium tube with a thickness of 2 cm, and each of the nozzle members is further provided with a rotation control member capable of rotating the nozzle forward/downward/backward for 180 degrees and capable of slightly swinging the nozzle leftward and rightward. The air-flow switching valve is able to control the flow rate of the air-flow passing through the nozzle and open/close the nozzle valve.

During operation of the air compression type engine, at least two lower nozzle members or at least the rear nozzle member must be kept in the ON state, i.e., closing off all of the nozzles is strictly prohibited in any case.

When the aircraft is about to take off, the four lower nozzle members (5, 6, 7 and 8) are opened and adjusted to orientations vertically facing downward. The engine then starts thereafter, and the air-flow rate of pertaining nozzles is regulated according to the state of the aircraft to make the aircraft take off stably. When the aircraft raises above the ground for five meters or even higher, ejection directions of the four lower nozzle members (5, 6, 7 and 8) are turned backwardly, generating upward and forward resultant forces and making the aircraft fly upwardly and forwardly at a certain angle. When the aircraft raises to a desired altitude, the ejection directions of the four lower nozzle members (5, 6, 7 and 8) are turned backwardly to 180 degrees. The rear nozzle member 9 is gradually opened while the four lower nozzle members (5, 6, 7 and 8) are gradually closed to make the aircraft fly horizontally. As soon as the four lower nozzle members (5, 6, 7 and 8) are completely closed, the rear nozzle 9 is fully opened, and then the pilot may operate the aircraft in the same way as that for operating a common jet type plane.

When the aircraft is about to land, the ejection directions of the four lower nozzle members (5, 6, 7 and 8) are turned forwardly. The rear nozzle member 9 is gradually closed while the four lower nozzle members (5, 6, 7 and 8) are gradually opened. As soon as the four lower nozzle members (5, 6, 7 and 8) are fully opened, the rear nozzle 9 is completely closed, making the aircraft decelerates gradually. When arriving the destination, the ejection directions of the four lower nozzle members (5, 6, 7 and 8) can be turned to a downward orientation, and the fuel ejection amount can be gradually decreased, making the aircraft vertically land slowly.

Figure 7:
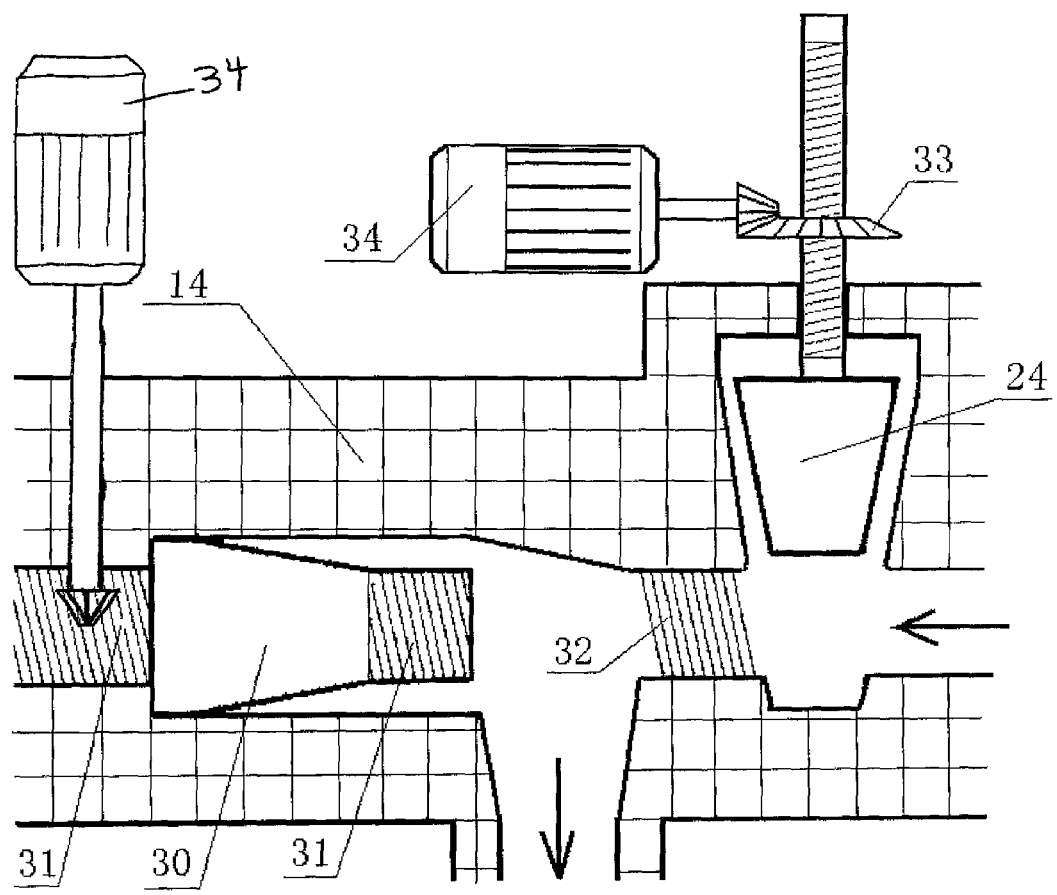
FIG. 7 is an illustration showing a partial sectional view of an air-flow switching valve.

As shown in FIG. 7, in which the direction of the arrow indicates the direction of the air-flow, the air-flow switching valve member 14 is consisted of shutter valve and regulation valve, which is characterized in that:

1. the valve spool 24 of the shutter valve is a wedge-shaped member, which is capable of eliminating the problem that the intake port of the high pressure air may be tightly closed due to the differences in the rate of thermal contract/expansion between the valve spool 24 and the passage wall. Because the valve spool 24 blocks in front of the intake port of the high pressure air, and the area of the same is ⅓ times larger than that of the intake port of the high pressure air, the pressure of the high pressure air in the pressure chamber does not exert directly on the valve spool 30 of the regulation valve, thereby preventing any accident from happening due to auto ejection of the high pressure air, which maybe caused by the damage of the thread 32 of the regulation valve resulting from the fact that the valve spool 30 stays always in the high pressure state.

2. the valve spool 30 of the regulation valve is a truncated cone-shaped member, which is fixed to a middle section of the valve shaft 31 of the regulation valve. The valve body of the regulation valve is provided with corresponding sealing surface. Front and rear sections of the valve shaft of the regulation valve engage with the thread of the valve body of the regulation valve. The valve shaft 31 of the regulation valve is provided with sealing thread. When the nozzles are to be opened, initially the driving motor 34 coupled to the shutter valve gets started to rise the shaft of the shutter valve, bring the shutter valve move upwardly, and eventually open up the intake port for the high pressure air. At that moment, the driving motor coupled to the valve shaft 31 of the regulation valve starts to adjust the valve shaft 31 of the regulation valve to move backwardly. This makes the intake port for high pressure air and the nozzles get opened, and then the high pressure air within the pressure chamber can be ejected from the nozzles. Because the valve spool 30 of the regulation valve is a truncated cone-shaped member, the backward movement length of the valve spool 30 can determine the flow rate of the high pressure air ejected from the high pressure chamber, thereby controlling the thrust force generated from the nozzles.

When the nozzles are about to close, initially the driving motor coupled to the valve shaft 31 of the regulation valve starts to drive the valve shaft 31 moving forwardly, thus closing the intake port for the high pressure air and the nozzles, and preventing the high pressure air within the pressure chamber from being ejected through the nozzles. The valve spool 30 of the regulation valve is the truncated cone-shaped member provided at a front end thereof with a cylinder member with sealing thread, which is fixed to the valve shaft 31 of the regulation valve and can be screwed together with the thread of the passage. Consequently the valve spool 30 of the regulation valve is able to surely close up the intake port for the high pressure air.

3. Both the nut 33 of the valve shaft of the shutter valve and the valve shaft 31 of the regulation valve are driven by a driving motor for controlling and regulating the ejecting air-flow.

The lower nozzle members functioning to make the aircraft raise/lower, decelerate, suspend in the air, or slowly move forward, backward, leftward or rightward and the rear nozzle member functioning to provide thrust force for forward movement of the aircraft may be designed alternatively in the following way according to practical requirements.

In FIG. 8, the main support frame of the aircraft is made hollow and thus is formed as a part of the engine pressure chamber, and is divided into two parts, which are a left hollow main support frame 42 and right hollow main support frame 36. In this way, the internal space of the aircraft can be used effectively, and the internal volume occupied by the engine can be decreased. The pressure chamber 3 is connected to the left hollow main support frame 42. The right hollow main support frame 36 and the lower nozzle member 40 are in turn connected to the left hollow main support frame 42 via the switch member 37. The end of the right hollow main support frame 36 is provided with the rear nozzle member 9. The switch member 37 can control the high pressure air-flow in the pressure chamber to pass through the left hollow main support frame 42 and the rear nozzle intake passage 39 to the right hollow main support frame 36, and finally eject from the rear nozzle 9 for pushing the aircraft to fly forwardly. Additionally, the high pressure air-flow in the pressure chamber may pass through the left hollow main support frame 42 and the lower nozzle member intake passage 38 to the lower nozzle member 40, and finally eject from the lower nozzle group 41. The face of the lower nozzle member 40 which is provided with the lower nozzle group 41 can be swung forward, backward, leftward and rightward to enable the lower nozzle group 41 to eject the air-flow in all directions, thereby driving the aircraft to take off/land, decelerate, suspend or move slowly forward, backward, leftward and rightward.

Figure 9:
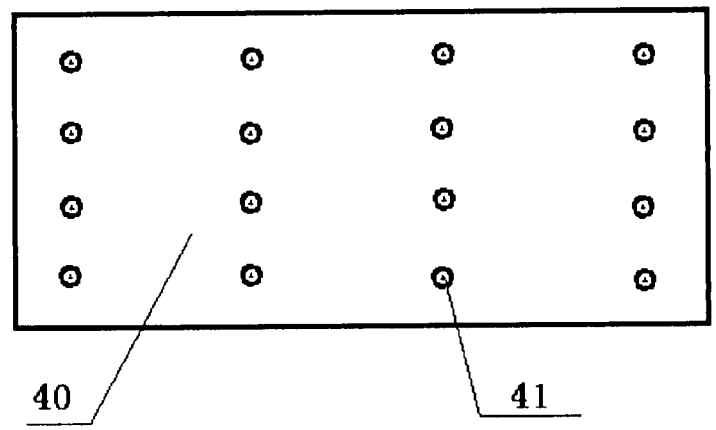
FIG. 9 is an illustration showing a configuration of the ejection interface of the lower ejection nozzle component.

As shown in FIG. 9, several small nozzles 41 (for example, generally sixteen nozzles arranged in four lines, which may be changed according to the practical requirements) consisting of a lower nozzle group are provided in an air ejection face of the lower ejection member 40 for enlarging the air ejection area of the air-flow ejected underneath the aircraft. This may greatly decrease the force impinged on the ground by the air-flow ejected underneath the aircraft, and further dramatically increase the supporting area of the aircraft for rising up. Consequently the aircraft can be operated relatively easier and more stable during process of taking off/landing or suspending.

As shown in FIG. 8, the inventive designs of the lower nozzle member 40 and the rear nozzle member 9 provide a more scientific and easier way for the pilot to operate the aircraft when compared with the designs of the four nozzle members (5, 6, 7, and 8) and the rear nozzle member 9 shown in FIG. 1. By means of the design shown in FIG. 8, the pilot may operate the aircraft to takeoff/land, decelerate, suspend or move slowly forward, backward, leftward and rightward conveniently by merely control one switch member 37. While with the design shown in FIG. 1, the pilot must control simultaneously five switch members of the four lower nozzle members (5, 6, 7, and 8) and the rear nozzle member 9, and must ensure at least one nozzle member is in ON state to avoid the accidental crash. The design in FIG. 8, therefore, is a more preferred embodiment to implement the present invention.

The invention claimed is:

1. An air compression type engine for aviation, comprising:
   an air intake port (4),
   a turbo-charged air compressor (1),
   a combustion chamber (1),
   a rear nozzle member, characterized in that a pressure chamber (3) containing high temperature, high pressure gas generated by the turbo-charged air compressor is arranged between the rear nozzle for providing thrust force for forward flying and the combustion chamber, and
   a lower nozzle member receiving and ejecting the high temperature, high pressure gas for thrust in a vertical direction, all nozzle members being connected with this pressure chamber;
   wherein the turbo-charged air compressor includes an intake compressor (10), a large supercharging compressor module (11), and a small supercharging compressor (12) which are coupled to a front transmission shaft (35), and further includes a front driving turbine (25) and a rear driving turbine (26) which are coupled to a rear transmission shaft (16); a speed changed gear box (13) is arranged between the front transmission shaft (35) and the rear transmission shaft (16), the combustion chamber is arranged behind the speed changed gear box (13), and a fuel nozzle is arranged at the front end of the combustion chamber (3); after being pressurized by the intake compressor (10) and the large supercharging compressor module (11) for few levels, a large portion of the air enters into a main intake passage, while a small portion of the air enters into a sub-intake passage after being further pressurized by the small supercharging compressor (12); the air entering the sub-intake passage is mixed with fuel sprayed by the fuel nozzle (15) at the front part of the combustion chamber for effecting strong explosive combustion, the air entering the main intake passage is mixed with the gas in explosive combustion at the rear part of the combustion chamber (20), and the oxygen contained in the air facilitates the combustion of the remained unburnt fuel; the high temperature and high pressure gas generated by the explosive combustion is ejected through an exhausting port (19) of an ejection fence to drive the front driving turbine (25) to rotate, then passes through an intake port (28) of a cover of the rear driving turbine to drive the rear driving turbine (26) to rotate, and finally enters the pressure chamber (3); a large torque generated by rotation of the front driving turbine and the rear driving turbine exerts to the speed changed gear box (13) via the rear transmission shaft (16), increasing a rotation speed of the front transmission shaft, and thereby making the intake compressor (11), the large supercharging compressor module (12), and the small supercharging compressor (13) coupled to the front transmission shaft rotate in a high speed, brings in more air and generates large pressure to force the intake air passing through the main intake passage and the sub-intake passage and entering the combustion chamber; the high temperature and the high pressure gas entering the pressure chamber can be ejected through the rear nozzle member to push the aircraft flying forwardly, or ejected through the lower nozzle member to make the aircraft take off/land vertically, decelerate, suspend in the air, or move slowly forward, backward, leftward and rightward;
   the high pressure air-flow generated by the turbo-charged air compressor (1) is not ejected to the outside immediately, but is ejected into the pressure chamber (3) to generate high temperature and high pressure gas within the pressure chamber (3), thus the pressure chamber can be used as a buffer for the ejection air-flow;
   the pressure chamber (3) is positioned behind the combustion chamber (20), the noise produced by explosive combustion of the fuel in the combustion chamber (20) can be isolated and absorbed by the high pressure gas in the pressure chamber (3) and without being spread to the outside.

2. The air compression type engine for aviation according to claim 1, characterized in that:
   a main support frame of the aircraft is made hollow and is formed as a part of the engine pressure chamber, and is divided into two parts, which are a left hollow main support frame and a right hollow main support frame;
   the pressure chamber is connected to the left hollow main support frame, the right hollow main support frame and the lower nozzle member are connected to the left hollow main support frame via a switch member (37), the end of the right hollow main support frame is provided with a rear nozzle member (9);
   the switch member can control the high pressure air-flow in the pressure chamber to pass through the left hollow main support frame to the right hollow main support frame and finally eject from the rear nozzle for pushing the aircraft to fly forwardly, or alternatively the switch member can control the high pressure air-flow in the pressure chamber to pass through the left hollow main support frame to the lower nozzle member and finally eject from the lower nozzle group; the face of the lower nozzle member which is provided with the lower nozzle group can be swung forward, backward, leftward and rightward to right to enable the lower nozzle group to eject the air-flow in all directions, thereby driving the aircraft to take off/land, decelerate, suspend or move slowly forward, backward, leftward and rightward.

3. The air compression type engine for aviation according to claim 2, characterized in that:
   several small nozzles consisting of the lower nozzle group are provided in an air ejection face of the lower ejection member for enlarging the air ejection area of the air-flow ejected underneath the aircraft.

4. The air compression type engine for aviation according to claim 1, characterized in that:
   a front right nozzle member, a front left nozzle member, a rear right nozzle member, and a rear left nozzle member are provided on the pressure chamber, each of these nozzle members is provided with a controller and an air-flow switching valve, the controller is used for regulating the nozzle member to rotate forward, downward, and backward for 180 degrees, and slightly swinging leftward and rightward; the rear nozzle member can push the aircraft flying forwardly, while the reaction force generated by the other four nozzle members can drive the aircraft to take off/land, decelerate, suspend or move slowly from forward, backward, leftward and rightward.

5. The air compression type engine for aviation according to claim 4, characterized in that:

the air-flow switching valve is consisted of a shutter valve and a regulation valve, wherein, a valve spool of the shutter valve is a wedge-shaped member, which is capable of eliminating the problem that the intake port of the high pressure air may be tightly closed due to the difference in the rate of thermal contract/expansion between the valve spool and the passage wall; because the valve spool blocks in front of the intake port of the high pressure air, and the area of the spool is ⅓ times larger than that of the intake port of the high pressure air, the pressure of the high pressure air in the pressure chamber does not exert directly on the valve spool of the regulation valve, thereby preventing any accident from happening due to auto ejection of the high pressure air, which maybe caused by the damage of the thread of the regulation valve resulting from the fact that the valve spool stays always in the high pressure state;

the valve spool of the regulation valve is a truncated cone-shaped member, which is fixed to a middle section of the valve shaft of the regulation valve, the valve body of the regulation valve is provided with corresponding sealing surface, front and rear sections of the valve shaft of the regulation valve engage with the thread of the valve body of the regulation valve; the valve shaft of the regulation valve is provided with sealing thread, when the nozzles are to be closed, initially a driving motor coupled to the valve shaft of the regulation valve starts to drive the valve shaft moving forwardly, thus closing the intake port for the high pressure air and the nozzles, and preventing the high pressure air within the pressure chamber from being ejected through the nozzles; the valve spool of the regulation valve is the truncated cone-shaped member provided at a front end thereof with a cylinder member with sealing thread, which is fixed to the valve shaft of the regulation valve and can be screwed together with thread of the passage, consequently the valve spool of the regulation valve is able to surely close up the intake port for the high pressure air; and both the nut of the valve shaft of the shutter valve and the valve shaft of the regulation valve are driven by the driving motor for controlling and regulating the ejecting air-flow.

* * * * *